J. M. CLARK.
POWER GENERATING PLANT.
APPLICATION FILED MAR. 19, 1917.
1,315,595.
Patented Sept. 9, 1919.
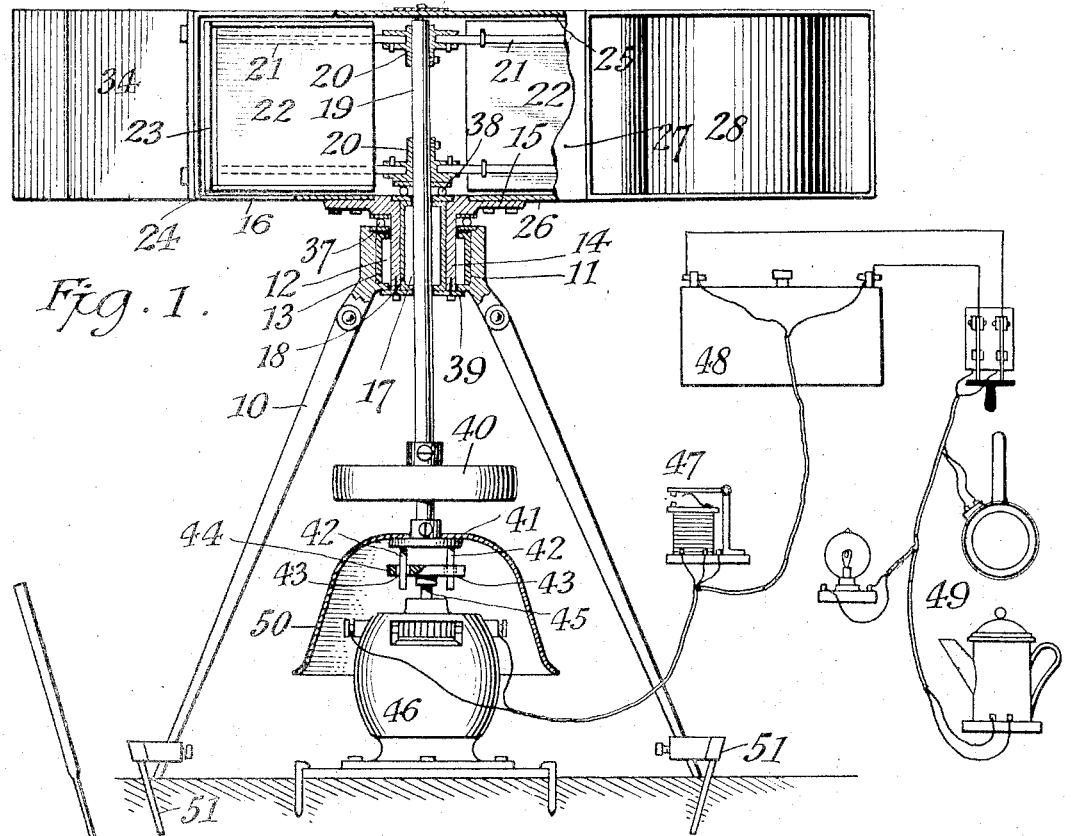
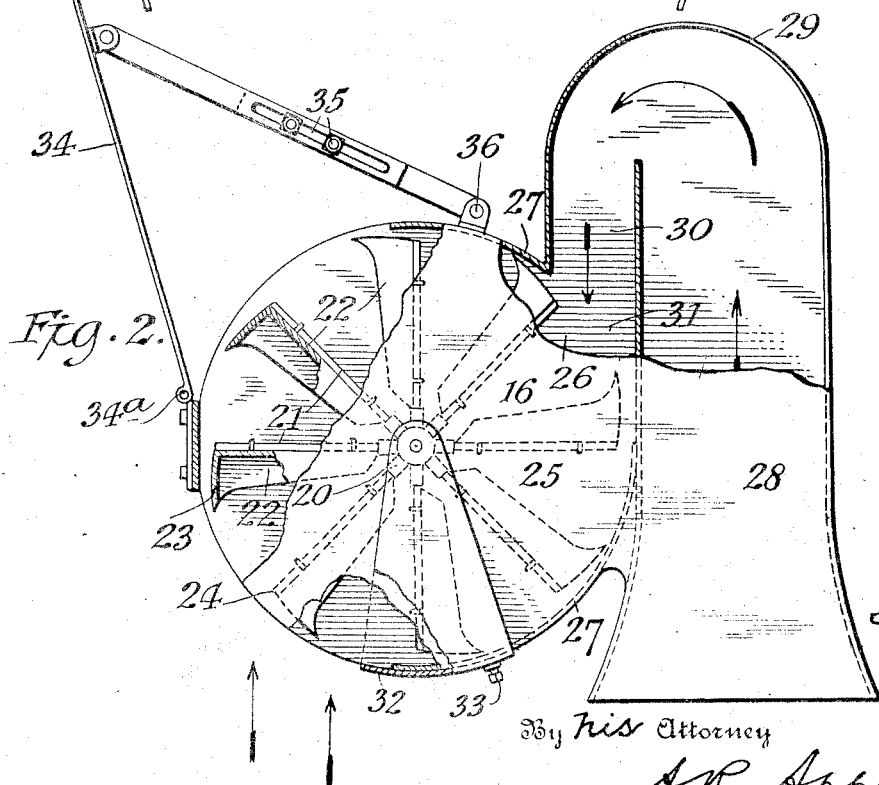
J. M. CLARK,
Inventor,
By his Attorney
A. R. Appleman

UNITED STATES PATENT OFFICE.

JOHN M. CLARK, OF WHITESTONE, NEW YORK.

POWER-GENERATING PLANT.

1,315,595.   Specification of Letters Patent.   Patented Sept. 9, 1919.

Application filed March 19, 1917. Serial No. 155,890.

*To all whom it may concern:*

Be it known that I, JOHN M. CLARK, a citizen of the United States, residing at Whitestone, Queens county, New York, have invented certain new and useful Improvements in Power-Generating Plants, of which the following is a specification.

My present invention relates to a wind driven power generating plant of simple and inexpensive construction for generating electricity adapted for effective use in bungalow, suburban and camping colonies and for general use wherever practicable.

A principal object is to provide a wind driven wheel having a plurality of buckets of novel construction, and a floating casing partially inclosing the wheel, said casing having a return draft tube, whereby air currents are directed against or into the wheel buckets at one side of the structure, in a direction opposite to the movement of the wind, thus imparting air pressure to the idle buckets and greatly increasing the effectiveness of the apparatus.

The invention has for a further object the provision of other new and novel features of construction and combinations of parts which will be hereafter fully described and pointed out in the appended claims.

In the drawings forming part of this specification similar reference characters are employed to designate corresponding parts throughout the several views in which:

Figure 1 is a front elevation of my improved power plant partly in section.

Fig. 2 is a plan view thereof partly broken away and in section.

In carrying out my invention I provide a tripod 10 of suitable construction provided at the top with an annular chamber 11, in which is carried a plurality of anti-friction rollers 12, mounted in a suitable cage or ring 13, and rotatably carried in the annular chamber 11, is a tubular floating hub 14, bearing against the rollers 12, which hub is provided with a horizontal flange 15, to which is bolted or otherwise secured a casing 16.

Roller bearings 17, carried in a suitable cage or ring 18, are provided within the floating hub 14, and are arranged around and bear against a central shaft 19, provided with spider hub 20, fixed thereto, and carrying radially extending arms 21, arranged in vertical pairs, to which are fixed a plurality of buckets 22, of a width approximately the depth of the casing 16, and having "hook" ends as at 23, so that air currents entering the casing in the direction of the arrows will have more effective impact on the wheel 24, which is constituted by the arms 21, and buckets 22, as will be readily understood.

The casing 16, comprises top and bottom walls 25, and 26, and a side wall as at 27, cut away at the left of the structure as shown so that direct air currents may enter to impinge against the buckets, the right of the casing being provided with a return draft tube 28, elbowed at 29, and preferably choked or contracted at 30, to provide a nozzle 31, through which the air enters at high velocity to contact with the buckets at that side of the casing.

An adjustable shield or valve 32, is swung from the center of the casing 16, and may be locked in a desired position to control the air currents, by a set screw 33.

A controlling vane or tail 34, is hinged to the casing at 34ª, and is adjustably held in operative position by a two part brace having slot and bolt connection 35, and being hinged to the casing as at 36.

Suitable anti-friction bearings 37, are placed between the floating hub 14, and the tripod head and other similar bearings 38, are placed between the said hub and the lower spider hub 20, of the wheel 24, the inner roller bearings 17, being retained in position by a suitable ring 39. The shaft 19, is extended downwardly and carries, in fixed relation, a fly wheel 40, and a disk 41, having depending pins 42, adapted to enter suitable openings 43, in a cross head 44, fixed to a shaft 45, extending upwardly from a dynamo generator 46, which is wired through an automatic switch 47, to a storage battery 48, from which electrical energy may be conducted to a lamp or cooking and heating utensils as indicated generally at 49.

To protect the dynamo 46, from the weather I fix a bell on cover 50, to the disk 41, and the tripod legs are preferably provided with suitable anchors 51, so that the apparatus will withstand high wind velocity without damage.

It will be understood that since the casing 16, as described, is secured to the floating hub it can be properly termed a floating casing as it turns or revolves with the hub as the direction of wind changes, which is effectively accomplished through the instrumentality of the controlling vane 34.

What I claim is:

1. In a plant of the class described a wind driven wheel having a casing mounted in floating relation therewith, said casing being provided at one side with a return draft tube and at the other side with a main ingress opening and a controlling vane as shown and described.

2. In a power plant of the class described a wind driven wheel having a plurality of buckets, a floating casing partially inclosing the wheel, said casing being provided with a return draft tube at one side and with a main ingress opening and a controlling vane at the other side, as shown and described.

3. In a power plant, a wheel having a plurality of buckets, a floating casing partially inclosing the same, said casing being provided with a return tube at one side and a main ingress opening and controlling vane at the other side as shown.

4. In a power plant, a floating casing having at one side a return draft tube provided with a choked nozzle and a main ingress opening at the opposite side, a wind driven wheel mounted to rotate in said casing and a controlling vane adjustably carried by the casing as shown and described.

5. In a power plant, a supporting tripod having anti-friction bearings, a casing having a hub confined and rotatable in said bearings, a wind driven wheel having a shaft mounted to rotate in the hub, said casing being also provided with a return draft tube at one side and an ingress opening and controlling vane at the opposite side as shown and described.

6. In a power plant, a support having anti-friction bearings, a shaft mounted to rotate in said support, a wind driven wheel fixed to said shaft and provided with buckets having hook ends, a casing having a hub confined and rotatable in said bearings and being provided with a return draft tube at one side and a controlling vane and air ingress opening at the other as shown.

7. In a power plant a floating casing having a return draft tube at one side, an ingress opening and an adjustable controlling vane at the other, a wind driven wheel mounted to rotate in said casing and being geared in connection with a dynamo for the purpose specified.

8. In a power plant, a floating casing having a return draft tube at one side and a hinged controlling vane and air ingress opening at the opposite side, an adjustable brace hinged to the casing and to the vane, and a wind driven wheel rotatably mounted in the casing as and for the purpose described.

In testimony whereof, I have signed my name to this specification, this 28th day of February, 1917.

JOHN M. CLARK.